United States Patent
Hashimoto et al.

(10) Patent No.: US 12,528,514 B2
(45) Date of Patent: Jan. 20, 2026

(54) AUTONOMOUS VEHICLE HAVING A DEVICE WHICH EVALUATES DRIVING PERFORMANCE

(71) Applicant: TOYOTA JIDOSHA KABUSHIKI KAISHA, Toyota (JP)

(72) Inventors: Sho Hashimoto, Susono (JP); Satoshi Nakamura, Shizuoka-ken (JP); Tomoki Somiya, Okazaki (JP); Kazumasa Harada, Nagakute (JP); Hiroki Yabushita, Toyota (JP); Sei Miyazaki, Susono (JP); Yuki Nishikawa, Numazu (JP); Noriaki Hasegawa, Izunokuni (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 74 days.

(21) Appl. No.: 18/441,178

(22) Filed: Feb. 14, 2024

(65) Prior Publication Data
US 2024/0286648 A1    Aug. 29, 2024

(30) Foreign Application Priority Data

Feb. 28, 2023  (JP) .................. 2023-029966

(51) Int. Cl.
*B60W 60/00* (2020.01)
*G06V 20/59* (2022.01)
*G06V 40/16* (2022.01)

(52) U.S. Cl.
CPC ....... *B60W 60/0027* (2020.02); *G06V 20/597* (2022.01); *G06V 40/174* (2022.01)

(58) Field of Classification Search
None
See application file for complete search history.

(56) References Cited

U.S. PATENT DOCUMENTS

2019/0047584 A1* 2/2019 Donnelly ............. B60W 50/10
2019/0332106 A1* 10/2019 Belloni Mourao ... B60W 40/08
(Continued)

FOREIGN PATENT DOCUMENTS

| JP | 2018-077854 A | 5/2018 |
| JP | 2021-062780 A | 4/2021 |
| JP | 2021-123146 A | 8/2021 |

OTHER PUBLICATIONS

Sho Hashimoto et al., U.S. Appl. No. 18/442,582, filed Feb. 15, 2024 (Published as US2024/0286645A1).
(Continued)

*Primary Examiner* — James J Lee
*Assistant Examiner* — Jonathan E Reinert
(74) *Attorney, Agent, or Firm* — SoraIP, Inc.

(57) ABSTRACT

A vehicle includes an interface unit that is configured to be able to communicate with an autonomous driving kit configured to be attachable to and detachable from the vehicle and that gives a control instruction related to autonomous driving control to each part of the vehicle based on an instruction from the autonomous driving kit, and an active safety device that implements an active safety function of the vehicle. The active safety device includes an acquisition unit that acquires at least one piece of participant information that is information related to a traffic participant present around the vehicle, and occupant information that is information related to an occupant riding in the vehicle; and a performance evaluation unit that evaluates driving performance of the autonomous driving kit based on at least one piece of the participant information and the occupant information.

6 Claims, 2 Drawing Sheets

(56) References Cited

U.S. PATENT DOCUMENTS

| | | | |
|---|---|---|---|
| 2021/0107521 A1 | 4/2021 | Fujita et al. | |
| 2021/0107528 A1 | 4/2021 | Fujita et al. | |
| 2021/0146933 A1 | 5/2021 | Klingebiel et al. | |
| 2021/0146956 A1 | 5/2021 | Fujita et al. | |
| 2021/0146958 A1 | 5/2021 | Tanaka et al. | |
| 2021/0245806 A1 | 8/2021 | Suzuki et al. | |
| 2022/0244736 A1* | 8/2022 | Konrardy | G05D 1/617 |
| 2023/0053243 A1* | 2/2023 | Lin | B60W 60/0015 |
| 2023/0080716 A1 | 3/2023 | Markofsky | |
| 2023/0192099 A1* | 6/2023 | Rusciano | B60W 60/001 |
| | | | 701/25 |
| 2023/0399019 A1 | 12/2023 | Lee et al. | |
| 2024/0286645 A1 | 8/2024 | Hashimoto et al. | |

OTHER PUBLICATIONS

Office Action issued to U.S. Appl. No. 18/442,582 on Jul. 23, 2025.

\* cited by examiner

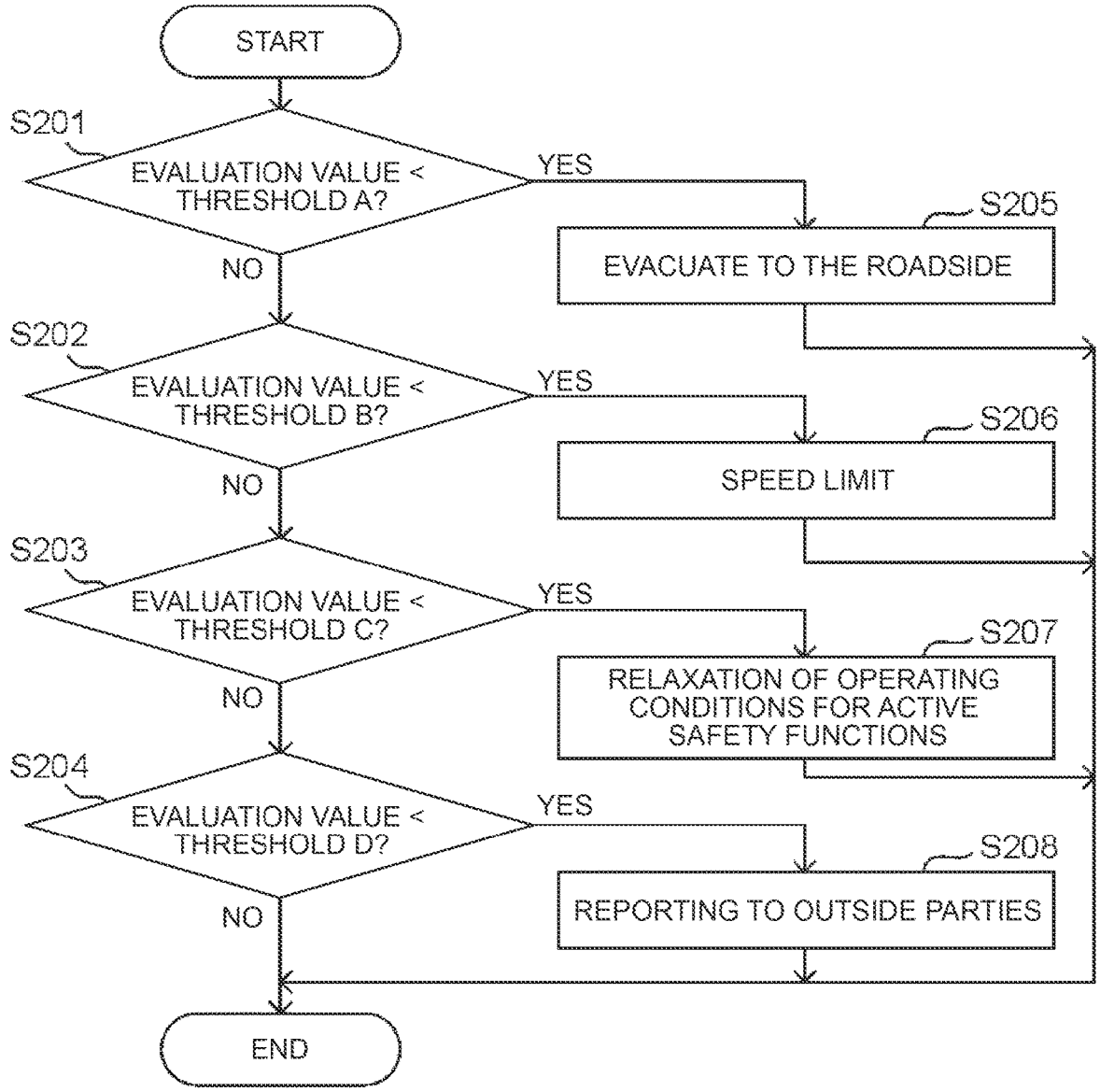

AUTONOMOUS VEHICLE HAVING A DEVICE WHICH EVALUATES DRIVING PERFORMANCE

CROSS-REFERENCE TO RELATED APPLICATION

This application claims priority to Japanese Patent Application No. 2023-029966 filed on Feb. 28, 2023 incorporated herein by reference in its entirety.

BACKGROUND

1. Technical Field

The present disclosure relates to the technical field of vehicles.

2. Description of Related Art

For example, a vehicle has been proposed that is autonomously driven by control instructions being output to functional units of the vehicle according to instructions from an autonomous driving kit attachable to and detachable from the vehicle (Japanese Unexamined Patent Application Publication No. 2021-123146 (JP 2021-123146 A)). A vehicle control system has also been proposed that includes a first unit that generates a target trajectory based on a vehicle travel plan, and a second unit that performs vehicle travel control so that the vehicle follows the target trajectory. The second unit of the vehicle control system intervenes in a travel controlled variable so as to prevent a collision between the vehicle and an obstacle (see Japanese Unexamined Patent Application Publication No. 2021-062780 (JP 2021-062780 A)).

SUMMARY

Vehicles that are autonomously driven by an autonomous driving kit have a technical problem in that autonomous driving cannot be continued if an abnormality occurs in the functions of the autonomous driving kit.

The present disclosure was made in view of the above problem, and an object of the present disclosure is to provide a vehicle that can detect a sign of abnormality in an autonomous driving kit.

A vehicle according to an aspect of the present disclosure includes: an interface unit that is configured to be able to communicate with an autonomous driving kit configured to be attachable to and detachable from the vehicle and that gives a control instruction related to autonomous driving control to each part of the vehicle based on an instruction from the autonomous driving kit; and an active safety device that implements an active safety function of the vehicle. The active safety device includes:
an acquisition unit that acquires at least one piece of participant information that is information related to a traffic participant present around the vehicle, and occupant information that is information related to an occupant riding in the vehicle; and
a performance evaluation unit that evaluates driving performance of the autonomous driving kit based on at least one piece of the participant information and the occupant information.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is an example of information showing the relationship between reactions and evaluations; and FIG. 4 is a flowchart showing another example of the operation of the active safety device according to the embodiment.

DETAILED DESCRIPTION OF EMBODIMENTS

Figure 1:
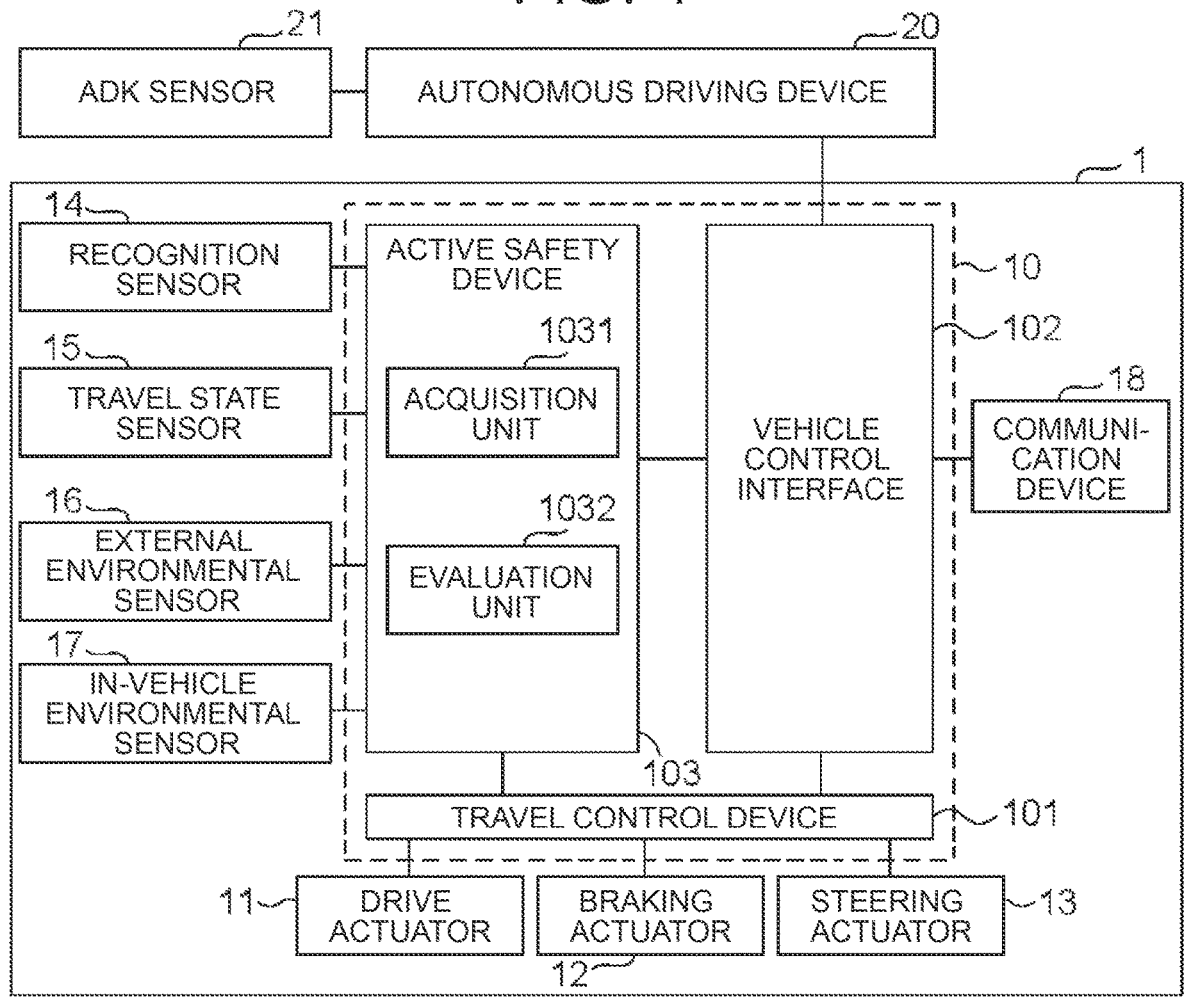
FIG. 1 is a block diagram showing the configuration of a vehicle according to an embodiment.

An embodiment related to a vehicle will be described with reference to FIGS. 1 to 4.
Vehicle Configuration In FIG. 1, a vehicle 1 includes a travel control system 10, a drive actuator 11, a brake actuator 12, a steering actuator 13, a recognition sensor 14, a travel state sensor 15, an external environmental sensor 16, an in-vehicle environmental sensor 17, and a communication device 18.

An autonomous driving device 20 is connected to the vehicle 1. The autonomous driving device 20 is a device that is detachable from the vehicle 1 and is independent from the vehicle 1. The autonomous driving device 20 may be wired to the travel control system 10 through a detachable connector. Here, the travel control system 10 is a system specific to the vehicle 1. The travel control system 10 is provided together with the vehicle 1 by an automobile manufacturer. In contrast, the autonomous driving device 20 is often designed and developed by a separate entity from the travel control system 10. Note that the autonomous driving device 20 may be referred to as an Autonomous Driving Kit (ADK).

The travel control system 10 and the autonomous driving device 20 may configure an autonomous driving system for automatically driving the vehicle 1. Note that "autonomous driving" may mean, for example, autonomous driving at level 3 or higher in the level definition of the Society of Automotive Engineers (SAE).

The travel control system 10 may include one or more processors and memory coupled to the processors. The travel control system 10 may be electrically connected to in-vehicle actuators (e.g., drive actuator 11, brake actuator 12, and steering actuator 13), on-vehicle sensors (e.g., recognition sensor 14, travel state sensor 15, external environmental sensor 16, and in-vehicle environmental sensor 17), and a communication device 18 through an in-vehicle network (e.g., Controller Area Network (CAN)).

The drive actuator 11 is an actuator for accelerating the vehicle 1. The brake actuator 12 is an actuator for decelerating or stopping the vehicle 1. Steering actuator 13 is an actuator for steering vehicle 1.

The recognition sensor 14 may include at least one of a camera (that is, an image sensor) and a radar sensor (e.g., millimeter wave radar, laser radar). The recognition sensor 14 is used to detect objects (for example, vehicles, pedestrians, bicycles, and fallen objects) existing around the vehicle 1 and to measure the relative position and velocity of the detected object with respect to the vehicle 1. The travel state sensor 15 may include at least one of a speed sensor, an acceleration sensor, and a yaw rate sensor. The travel state sensor 15 is used to measure at least one of a physical quantity (for example, speed, acceleration, yaw rate) and a parameter indicating the running state of the vehicle 1. The external environmental sensor 16 is a sensor that acquires information regarding the external environment of the vehicle 1. External environmental sensor 16 may include at least one of a raindrop sensor and a temperature sensor. The in-vehicle environmental sensor 17 is a sensor that acquires information regarding the in-vehicle environment of the vehicle 1. The in-vehicle environmental sensor 17 may include at least one of a camera, a temperature sensor, and a pressure sensor.

The communication device 18 is a device for the vehicle 1 to perform data communication with the outside. The communication device 18 may be connected to an external communication network by wireless communication. Therefore, the vehicle 1 may be a so-called connected car.

The travel control system 10 includes a travel control device 101, a vehicle control interface 102, and an active safety device 103 as logically realized functional blocks or physically realized processing circuits. Note that the travel control device 101, vehicle control interface 102, and active safety device 103 will be described later.

The autonomous driving device 20 is electrically coupled to the ADK sensor 21. The ADK sensor 21 may be configured integrally with the autonomous driving device 20. The ADK sensor 21 may be detachably attached to the autonomous driving device 20 or the vehicle 1. The ADK sensor 21 is a sensor for acquiring information necessary for the autonomous driving device 20 to drive the vehicle 1. For example, ADK sensor 21 may include a camera, a radar sensor, and a Global Positioning System (GPS) sensor.

The autonomous driving device 20 may have a function of formulating a travel plan. The autonomous driving device 20 may calculate a target trajectory on which the vehicle 1 will travel based on the created travel plan and the information acquired by the ADK sensor 21. For example, the target trajectory may include a sequence of points indicating a plurality of target positions of the vehicle 1, and at least one of a target speed and a target acceleration at each of the plurality of target positions. The autonomous driving device 20 transmits the calculated target trajectory to the travel control system 10. Note that the autonomous driving device 20 may repeatedly calculate the target trajectory and transmit the calculated target trajectory to the travel control system 10 at a predetermined period.

The target trajectory transmitted from the autonomous driving device 20 is input to the travel control device 101 via the vehicle control interface 102 of the travel control system 10. For example, the travel control device 101 determines the drive control amount to be instructed to the drive actuator 11, the brake control amount to be instructed to the brake actuator 12, and the steering actuator 13 based on the target trajectory and the measurement results of the travel state sensor 15. At least one of the steering control amounts to be instructed is calculated.

The active safety device 103 is a device that intervenes in the travel control device 101 to prevent or avoid a collision between the vehicle 1 and an object. As control to prevent or avoid a collision between the vehicle 1 and an object, control to prevent the vehicle 1 from departing from the lane (e.g. lane departure prevention control, lane keeping support control), control for keeping the distance between the vehicle 1 and the preceding vehicle constant (e.g., inter-vehicle distance control), and control to automatically apply braking force to the vehicle 1 when there is a high possibility of a collision between the vehicle 1 and an object (e.g., collision damage reduction).

An example of a method for the active safety device 103 to intervene in the travel control device 101 is a method in which the active safety device 103 gives an intervention control amount to the travel control device 101. In this case, the intervention control amount may include at least one of a drive control amount, a braking control amount, and a steering control amount. When the active safety device 103 gives the travel control device 101 an intervention control amount, the travel control device 101 calculates the control amount calculated from the target trajectory (specifically, the drive control amount, braking control amount, and steering control amount). Priority is given to the intervention control amount over at least one of the following. The travel control device 101 controls at least one of the drive actuator 11, the brake actuator 12, and the steering actuator 13 according to the intervention control amount.

By the way, the autonomous driving device 20 detects objects existing around the vehicle 1 based on information acquired by the ADK sensor 21. Then, the autonomous driving device 20 calculates a target trajectory so that the vehicle 1 does not collide with the detected object. Therefore, theoretically, the travel control device 101 controls the control amount (specifically, at least one of the drive control amount, the braking control amount, and the steering control amount) according to the target trajectory calculated by the autonomous driving device 20. If calculated, a collision between the vehicle 1 and the object will not occur. However, due to some abnormality occurring in the autonomous driving device 20, the driving performance of the autonomous driving device 20 may permanently or temporarily deteriorate. Therefore, the active safety device 103 may operate as a last resort to prevent or avoid a collision between the vehicle 1 and an object.

From the viewpoint of active safety, the active safety device 103 has a function as a performance evaluation device that evaluates the driving performance of the autonomous driving device 20. The active safety device 103 may evaluate the driving performance of the autonomous driving device 20 based on information obtained from at least one of the recognition sensor 14, the travel state sensor 15, the external environmental sensor 16, and the in-vehicle environmental sensor 17. The active safety device 103 may evaluate the driving performance of the autonomous driving device 20 based on the information acquired via the communication device 18. Details of the evaluation of the driving performance of the autonomous driving device 20 will be described later. The active safety device 103 may take measures according to the evaluation results of the driving performance of the autonomous driving device 20.

Performance Evaluation Method

Figure 2:
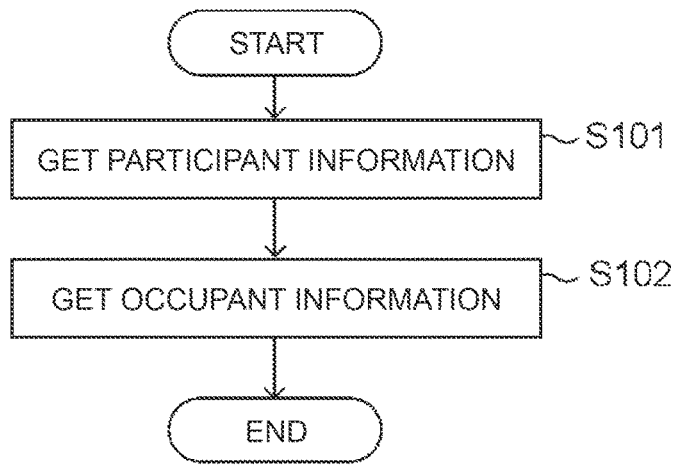
FIG. 2 is a flowchart showing an example of the operation of the active safety device according to the embodiment.

A method of evaluating the driving performance of the autonomous driving device 20 performed by the active safety device 103 will be described. In the flowchart of FIG. 2, the acquisition unit 1031 of the active safety device 103 acquires participant information that is information related to traffic participants existing around the vehicle 1 (S101). In parallel with the processing in S101, the acquisition unit 1031 acquires occupant information that is information related to the occupant riding in the vehicle 1 (S102). "Traffic participants" means those who are affected by the behavior of the vehicle 1 and those who influence the behavior of the vehicle 1. However, not only people, but also moving objects used by people (e.g., cars, motorcycles, bicycles, etc.) may also be referred to as "transport participants." For example, drivers of other vehicles traveling around the vehicle 1 correspond to traffic participants. In this case, other vehicles driven by the driver may also be referred to as traffic participants. Traffic participants may include, for example, at least one of occupants of automobiles, motorcycles, and bicycles, pedestrians, police officers, and guides.

Add explanation about acquiring participant information. The acquisition unit 1031 may acquire participant information by receiving information transmitted from traffic participants as the participant information via the communication device 18. For example, a traffic participant may evaluate the behavior of the vehicle 1 using an application installed on a terminal device (for example, a smartphone). The evaluation of the behavior of the vehicle 1 may include, for example, good (+1 point), safe (0 points), fair (−1 point), and dangerous (−2 points). The terminal device may transmit information indicating the evaluation of the behavior of the vehicle 1 by the traffic participants to the vehicle 1. The acquisition unit 1031 may acquire the transmitted information as participant information.

For example, when a recognition device (for example, a device corresponding to the recognition sensor 14) installed in another vehicle in which a traffic participant is riding recognizes vehicle 1, the other vehicle recognizes vehicle 1 by the recognition device. The behavior of the vehicle 1 may be automatically evaluated based on the results (for example, the speed of the vehicle 1, the distance between the other vehicle and the vehicle 1). The other vehicle may transmit information indicating an evaluation of the behavior of the vehicle 1 to the vehicle 1, for example, through vehicle-to-vehicle communication. The acquisition unit 1031 may acquire the transmitted information as participant information.

The acquisition unit 1031 may acquire information regarding the behavior of traffic participants based on information obtained from the recognition sensor 14 as participant information. For example, the acquisition unit 1031 may detect the behavior of other vehicles around the vehicle 1 based on information obtained from the recognition sensor 14. The acquisition unit 1031 may specify the evaluation regarding the vehicle 1 based on the detected behavior of the other vehicle and information indicating the relationship between the reaction and the evaluation, as shown in FIG. 3, for example. The acquisition unit 1031 may acquire the evaluation regarding the identified vehicle 1 as participant information. Note that the concept of other vehicles includes, for example, automobiles, motorcycles, and bicycles.

For example, when the detected behavior of the other vehicle is a movement away from the vehicle 1, the acquisition unit 1031 may specify that the evaluation regarding the vehicle 1 is "average (−1 point)". The acquisition unit 1031 may then acquire the evaluation "fair (−1 point)" as participant information. For example, if the detected behavior of the other vehicle is honking at vehicle 1 or passing at vehicle 1, the acquisition unit 1031 determines that the evaluation regarding vehicle 1 is "dangerous (−2 points)". Then, the acquisition unit 1031 may acquire the evaluation "dangerous (−2 points)" as participant information.

Add explanation about acquiring occupant information. The acquisition unit 1031 may acquire occupant information by receiving information transmitted from an occupant riding in the vehicle 1 via the communication device 18 as the occupant information. For example, the occupant may evaluate the behavior of the vehicle 1 using an application installed on a terminal device (for example, a smartphone). The evaluation of the behavior of the vehicle 1 may include, for example, good (+1 point), safe (0 points), fair (−1 point), and dangerous (−2 points). The terminal device may transmit information indicating the evaluation of the behavior of the vehicle 1 by the occupant to the vehicle 1. The acquisition unit 1031 may acquire the transmitted information as occupant information.

The acquisition unit 1031 may acquire information regarding the behavior of the occupant based on information obtained from the in-vehicle environmental sensor 17 as occupant information. For example, the acquisition unit 1031 may detect the behavior of the occupant based on information obtained from the in-vehicle environmental sensor 17. The acquisition unit 1031 may specify the evaluation regarding the vehicle 1 based on the detected behavior of the occupant and information indicating the relationship between the reaction and the evaluation, as shown in FIG. 3, for example. The acquisition unit 1031 may acquire the evaluation regarding the identified vehicle 1 as occupant information.

For example, when the detected behavior of the occupant is to make a grim expression, the acquisition unit 1031 may specify that the evaluation of the vehicle 1 is "average (−1 point)". Then, the acquisition unit 1031 may acquire the evaluation "fair (−1 point)" as the occupant information. For example, if the detected behavior of the occupant is that the seated occupant grabs onto the grip, the acquisition unit 1031 may specify that the evaluation regarding vehicle 1 is "dangerous (−2 points)". Then, the acquisition unit 1031 may acquire the evaluation of "danger (−2 points)" as occupant information. Note that the grip means a support for supporting the body of the occupant. Grips may include, for example, assist grips, armrests, and handrails.

The operation shown in the flowchart of FIG. 2 is repeatedly performed at a predetermined period. For example, if there are no traffic participants around the vehicle 1, the acquisition unit 1031 does not need to acquire participant information in the process of S101 described above. For example, if the occupant of the vehicle 1 does not evaluate the behavior of the vehicle 1, the acquisition unit 1031 does not need to acquire occupant information in the process of S102 described above.

The evaluation unit 1032 of the active safety device 103 evaluates the driving performance of the autonomous driving device 20 based on at least one of the participant information and occupant information acquired by the acquisition unit 1031. For example, the evaluation unit 1032 indicates a score (for example, 1 point, 0 point, −1 point, or −2 point) indicating the evaluation related to vehicle 1 as participant information and an evaluation related to vehicle 1 as occupant information. By adding the points (for example, 1 point, 0 point, −1 point, or −2 point), an evaluation value as an evaluation of the driving performance of the autonomous driving device 20 may be obtained.

For example, when two people as traffic participants rate vehicle 1 rates the vehicle 1 as "fair (−1 point)," one person as a traffic participant rates the vehicle 1 as "dangerous (−2 point)", and one person as an occupant rates the vehicle 1 as "fair (−1 point)," the evaluation unit 1032 may set "−5 points (=(−2)×2+(−2)×1+(−1)×1)" as an evaluation value for evaluating the driving performance of the autonomous driving device 20.

Note that if the value obtained by adding the above-mentioned points (i.e., the evaluation value) exceeds a predetermined initial value for evaluating the driving performance of the autonomous driving device 20, the evaluation unit 1032 may use the initial value as the evaluation value.

The evaluation unit 1032 may evaluate the driving performance of the autonomous driving device 20 based on at least one of participant information and occupant information acquired by the acquisition unit 1031 during a period from the current time to a predetermined time ago. In other words, the evaluation unit 1032 may not consider participant information and occupant information that have been acquired for a predetermined period of time (for example, 30 minutes, 1 hour, etc.) by the acquisition unit 1031 when evaluating the driving performance of the autonomous driving device 20.

The evaluation unit 1032 may perform weighted addition when adding up the scores (in other words, when calculating the evaluation value). In this case, the weight may become smaller as the elapsed time from acquisition by the acquisition unit 1031 becomes longer.

Note that each of the occupant information and participant information may include information regarding the sender. Information regarding the sender may include information indicating a police officer. The information regarding the sender may include information indicating the sender's rank based on the sender's past performance. In this case, when adding up the scores, the evaluation unit 1032 may perform weighted addition using weights depending on information regarding the sender. For example, the weight of participant information that includes information indicating a police officer may be greater than the weight of participant information that does not include information indicating a police officer (for example, includes information indicating that the participant is an ordinary person).

Based on the evaluation value as an evaluation of the driving performance of the active safety device 103 and the autonomous driving device 20 (that is, the evaluation result of the driving performance of the autonomous driving device 20 by the evaluation unit 1032), the operation shown in the flowchart of FIG. 4 is performed. In FIG. 4, threshold A is smaller than threshold B, threshold B is smaller than threshold C, and threshold C is smaller than threshold D (that is, threshold A<threshold B<threshold C<threshold D).

In FIG. 4, the active safety device 103 determines whether the evaluation value related to the autonomous driving device 20 is smaller than a threshold A (S201). In the process of S201, if it is determined that the evaluation value of the autonomous driving device 20 is smaller than the threshold A (S302: Yes), the active safety device 103 instructs the travel control device 101 to cause the vehicle 1 to retreat to the shoulder of the road. Intervention is performed (S205).

In the process of S201, if it is determined that the evaluation value related to the autonomous driving device 20 is equal to or higher than the threshold A (S201: No), the active safety device 103 determines whether the evaluation value related to the autonomous driving device 20 is smaller than the threshold B (S202). In the process of S202, if it is determined that the evaluation value related to the autonomous driving device 20 is smaller than the threshold B (S202: Yes), the active safety device 103 sets the speed of the vehicle 1 to be limited (for example, the speed of the vehicle 1 is intervention is performed on the travel control device 101 so that the speed of the vehicle does not exceed a predetermined speed (S206).

In the process of S202, if it is determined that the evaluation value related to the autonomous driving device 20 is equal to or higher than the threshold B (S202: No), the active safety device 103 determines whether the evaluation value related to the autonomous driving device 20 is smaller than the threshold C or not (S203). In the process of S203, if it is determined that the evaluation value related to the autonomous driving device 20 is smaller than the threshold C (S203: Yes), the active safety device 103 relaxes the operating conditions of the active safety function (in other words, the operating conditions are changed to make the function easier to operate) (S207).

In the process of S203, if it is determined that the evaluation value related to the autonomous driving device 20 is equal to or higher than the threshold C (S203: Yes), the active safety device 103 determines whether the evaluation value related to the autonomous driving device 20 is smaller than the threshold D or not (S204). In the process of S204, if it is determined that the evaluation value related to the autonomous driving device 20 is smaller than the threshold D (S204: Yes), the active safety device 103 makes a notification to the outside the vehicle 1 via the vehicle control interface 102 and the communication device 18 (S208).

In the process of S208, the active safety device 103 may report to Helpnet. Note that Helpnet refers to a management center for emergency response operated by at least one of a business that provides the vehicle 1 and a business that maintains the vehicle 1. As a result of the process in S208, the helpnet operator may perform emergency response regarding the vehicle 1. Alternatively, as a result of the process in S208, emergency response regarding the vehicle 1 may be performed by an automatic response of the Helpnet system. For example, as an emergency response for the vehicle 1, a vehicle stop instruction may be transmitted from Helpnet to the vehicle 1.

In the process of S204, when it is determined that the evaluation value related to the autonomous driving device 20 is equal to or greater than the threshold D (S204: No), the operation shown in the flowchart of FIG. 6 is ended. After that, the process of S201 may be performed.

Note that the operations shown in the flowchart of FIGS. 2 and 4 may be performed only when the vehicle 1 is traveling according to the target trajectory calculated by the autonomous driving device 20.

Technical Effect

When the vehicle 1 is traveling safely (for example, so that the vehicle 1 does not threaten traffic participants), the acquisition unit 1031 of the active safety device 103 is considered to hardly acquire participant information and occupant information. This is because the traffic participants and the occupants of vehicle 1 do not feel any discomfort in the behavior of vehicle 1, so the traffic participants and the occupants of vehicle 1 often do not have the desire to evaluate the behavior of vehicle 1.

On the other hand, if a traffic participant or a passenger of the vehicle 1 feels uncomfortable with the behavior of the vehicle 1, the acquisition unit 1031 is considered to acquire a relatively large amount of participant information and occupant information. In this case, the evaluation regarding the behavior of the vehicle 1 is considered to be negative (that is, the score indicating the evaluation takes a negative value). Therefore, the fact that a relatively large amount of participant information and occupant information is acquired by the acquisition unit 1031 can be interpreted as a sign that there is an abnormality in the autonomous driving device 20.

In addition, when the acquisition unit 1031 acquires a relatively large number of negative evaluations, the evaluation value as an evaluation of the driving performance of the autonomous driving device 20 obtained by the evaluation unit 1032 of the active safety device 103 becomes smaller than the initial value related to the evaluation of the operating performance of the autonomous driving device 20. Therefore, the fact that the evaluation value becomes smaller than the initial value can be interpreted as a sign that there is an abnormality in the autonomous driving device 20. Therefore, it can be said that the vehicle 1 equipped with the active safety device 103 can detect signs of abnormality in the autonomous driving device 20.

In addition, if the evaluation value related to the autonomous driving device 20 decreases by more than a predetermined value (for example, if the evaluation value falls below at least one of the thresholds A, B, C, and D in the flowchart of FIG. 4), the active safety device 103 intervenes in the travel control device 101. Here, if the evaluation value related to the autonomous driving device 20 has decreased by a predetermined value or more, there is a high possibility that an abnormality has occurred in the autonomous driving device 20. In this case, the safety of the vehicle 1 can be ensured by the active safety device 103 intervening with the travel control device 101.

Aspects of the disclosure derived from the embodiment described above will be described below.

A vehicle according to one aspect of the disclosure includes an interface unit that is configured to be able to communicate with an autonomous driving kit configured to be attachable to and detachable from the vehicle and that gives a control instruction related to autonomous driving control to each part of the vehicle based on an instruction from the autonomous driving kit, and an active safety device that implements an active safety function of the vehicle. The active safety device includes an acquisition unit that acquires at least one piece of participant information that is information related to a traffic participant present around the vehicle, and occupant information that is information related to an occupant riding in the vehicle, and a performance evaluation unit that evaluates driving performance of the autonomous driving kit based on at least one piece of the participant information and the occupant information.

In the embodiment described above, the "autonomous driving device 20" corresponds to an example of an "autonomous driving kit," the "vehicle control interface 102" corresponds to an example of an "interface unit," the "acquisition unit 1031" corresponds to an example of an "acquisition unit," and the evaluation unit 1032 corresponds to an example of the "performance evaluation unit."

The participant information may be information regarding the behavior of the traffic participant with respect to the vehicle. In this case, the behavior of the traffic participant toward the vehicle may include at least one of moving away from the vehicle, honking at the vehicle, and passing at the vehicle.

The occupant information may be information regarding the behavior of the occupant. In this case, the behavior of the occupant may include at least one of the occupant making a grim expression and the occupant holding onto a grip of the vehicle.

The present disclosure is not limited to the embodiments described above, and can be modified as appropriate within the scope or spirit of the disclosure that can be read from the claims and the entire specification, and vehicles with such modifications may also be modified. This is within the technical scope of the present disclosure.

What is claimed is:

1. A vehicle comprising a first processor configured to:
   communicate with an autonomous driving system configured to be attachable to and detachable from the vehicle, the autonomous driving system including a second processor configured to generate a traveling route along which the vehicle performs autonomous driving;
   transmit a control instruction related to autonomous driving control to actuators of the vehicle based on an instruction from the autonomous driving system;
   activate an active safety function in a case where an activation condition is satisfied, the active safety function controlling the vehicle to prevent or avoid a collision between the vehicle and an object regardless of the instruction from the autonomous driving system; and
   perform an evaluating process while the vehicle is traveling according to the control instruction, the evaluating process including
      receiving at least one piece of participant information that is information related to a traffic participant present around the vehicle, and occupant information that is information related to an occupant of the vehicle, and
      calculating a value indicating driving performance of the autonomous driving system based on the at least one piece of participant information and the occupant information,
      determining whether the calculated value is smaller than a first threshold;
      causing the vehicle to retreat to a shoulder of a road where the vehicle is traveling in response to a determination that the calculated value is smaller than the first threshold,
      determining whether the calculated value is smaller than a second threshold that is greater than the first threshold in response to a determination that the calculated value is equal to or greater than the first threshold;
      controlling a speed of the vehicle to stay within a predetermined limit in response to a determination that the calculated value is smaller than the second threshold,
      determining whether the calculated value is smaller than a third threshold that is greater than the second threshold in response to a determination that the calculated value is equal to or greater than the second threshold,
      changing the activate condition to make the active safety function easier to activate in response to a determination that the calculated value is smaller than the third threshold,
      determining whether the calculated value is smaller than a fourth threshold that is greater than the third threshold in response to a determination that the calculated value is equal to or greater than the third threshold, and
      outputting a notification that maintenance of the vehicle is necessary to outside the vehicle in response to a determination that the calculated value is smaller than the fourth threshold.

2. The vehicle according to claim 1, wherein the participant information is information regarding behavior of the traffic participant with respect to the vehicle.

3. The vehicle according to claim 2, wherein the behavior of the traffic participant with respect to the vehicle includes at least one of moving away from the vehicle, honking a horn at the vehicle, and flashing headlights at the vehicle.

4. The vehicle according to claim 1, wherein the occupant information is information regarding behavior of the occupant.

5. The vehicle according to claim 4, wherein the behavior of the occupant includes at least one of making a grim facial expression and holding onto a grip of the vehicle.

6. The vehicle according to claim 1, wherein
the participant information and the occupant information include sender information on a person who sends the participant information or the occupant information, and
the participant information and the occupant information of which the sender information indicates the person is a police officer are weighted greater than those of which the sender information does not indicate the person is the police officer in a calculation of the value of the driving performance of the autonomous driving system.

\* \* \* \* \*